(12) United States Patent
Gao et al.

(10) Patent No.: US 11,429,500 B2
(45) Date of Patent: Aug. 30, 2022

(54) SELECTIVE UTILIZATION OF PROCESSOR CORES WHILE REBUILDING DATA PREVIOUSLY STORED ON A FAILED DATA STORAGE DRIVE

(71) Applicant: EMC IP Holding Company LLC, Hopkinton, MA (US)

(72) Inventors: Hongpo Gao, Beijing (CN); Philippe Armangau, Acton, MA (US); Geng Han, Beijing (CN); Jian Gao, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 63 days.

(21) Appl. No.: 17/038,534

(22) Filed: Sep. 30, 2020

(65) Prior Publication Data
US 2022/0100621 A1 Mar. 31, 2022

(51) Int. Cl.
*G06F 11/00* (2006.01)
*G06F 11/20* (2006.01)
*G06F 13/16* (2006.01)
*G06F 11/10* (2006.01)
*G06F 3/06* (2006.01)

(52) U.S. Cl.
CPC ........ *G06F 11/2094* (2013.01); *G06F 3/0613* (2013.01); *G06F 11/1092* (2013.01); *G06F 13/1668* (2013.01); *G06F 2201/82* (2013.01)

(58) Field of Classification Search
CPC ............. G06F 11/1088; G06F 11/1092; G06F 11/2094; G06F 3/0631
See application file for complete search history.

(56) References Cited

U.S. PATENT DOCUMENTS

| | | | |
|---|---|---|---|
| 6,732,232 B2 * | 5/2004 | Krishnamurthy | G06F 9/5011 711/6 |
| 7,810,094 B1 | 10/2010 | McClure et al. | |
| 7,996,346 B2 * | 8/2011 | Bell, Jr | G06F 9/5083 718/107 |
| 9,201,802 B1 | 12/2015 | Armangau et al. | |
| 9,485,310 B1 * | 11/2016 | Bono | G06F 16/1824 |
| 10,038,744 B1 * | 7/2018 | Dagan | H04L 67/1097 |
| 10,817,220 B2 | 10/2020 | Bono et al. | |
| 2006/0206753 A1 * | 9/2006 | Yamato | G06F 11/1458 714/E11.12 |
| 2010/0058335 A1 * | 3/2010 | Weber | G06F 9/45558 718/1 |

(Continued)

*Primary Examiner* — Michael Maskulinski
(74) *Attorney, Agent, or Firm* — BainwoodHuang

(57) ABSTRACT

In response to failure of a data storage drive, data previously stored on the failed drive is rebuilt on a replacement data storage drive by executing drive rebuild jobs on a first set of processor cores. While the data previously stored on the failed data storage drive is being rebuilt, a second set of processor cores is used to process host I/O (Input/Output) requests. The host I/O requests processed by the second set of processor cores may be a first set of host I/O requests processed during the data rebuild. When a current total number of outstanding host I/O requests exceeds a threshold maximum number of outstanding host I/O requests, at least one processor core in the first set of processor cores may be used to process a second set of host I/O requests while the data previously stored on the failed data storage drive is being rebuilt.

15 Claims, 7 Drawing Sheets

(56) References Cited

U.S. PATENT DOCUMENTS

2017/0031699 A1* 2/2017 Banerjee ............. G06F 9/45558
2017/0090999 A1* 3/2017 Weber .................... G06F 9/528
2020/0319972 A1* 10/2020 Tang .................... G06F 3/0659

* cited by examiner

SELECTIVE UTILIZATION OF PROCESSOR CORES WHILE REBUILDING DATA PREVIOUSLY STORED ON A FAILED DATA STORAGE DRIVE

TECHNICAL FIELD

The present disclosure relates generally to data storage systems that rebuild data previously stored on a failed data storage drive using RAID (Redundant Array of Independent Disks) data protection, and more specifically to technology for selective utilization of processor cores by drive rebuild logic and host I/O request processing logic while rebuilding the data previously stored on the failed data storage drive.

BACKGROUND

Data storage systems are arrangements of hardware and software that may include one or more storage processors coupled to non-volatile data storage drives, such as solid state drives and/or magnetic disk drives. Each storage processor may process host I/O requests received from physical and/or virtual host machines ("hosts"). The host I/O requests received by a storage processor may specify one or more storage objects (e.g. logical units ("LUNs"), and/or files, etc.) that are hosted by the storage system and store user data that is written and/or read by the hosts. Each storage processor executes software that processes host I/O requests and performs various data processing tasks to organize and secure the user data in the non-volatile data storage drives of the data storage system.

Some data storage systems include RAID (Redundant Array of Independent Disks) data protection technology. RAID technology enables data previously stored on a failed data storage drive to be rebuilt on one or more functional data storage drives. Some RAID technology performs data striping, in which logically consecutive data blocks are stored across multiple different data storage drives in "stripes", together with corresponding per-stripe parity information. When a data storage drive fails, the data stored on the surviving data storage drives may be used together with the parity information to rebuild the data that was previously stored on the failed data storage drive on a replacement data storage drive (e.g. a spare data storage drive). In mapped RAID technology, each physical data storage drive is divided into multiple contiguous regions of physical non-volatile data storage referred to as "drive extents". Individual sets of multiple drive extents, in which each drive extent is located on a different data storage drive, are then used to store RAID stripes containing blocks of data and parity information in the manner that the data and parity information would be striped across multiple disks in the groups of disks used in traditional RAID systems.

SUMMARY

The time period during which data previously stored on a failed data storage drive is rebuilt on a replacement data storage drive is referred to herein for purposes of explanation as the "drive rebuild time window". During the drive rebuild time window, some number of drive rebuild jobs are executed on one or more of the processor cores of the data storage system to rebuild the data previously stored on the failed data storage drive on the replacement data storage drive. It is desirable for the data storage system to also continue processing host I/O requests during the drive rebuild time window. Accordingly, host I/O request processing logic requires the use of processor cores of the data storage system to process received host I/O requests during the drive rebuild time window.

In previous systems, the host I/O request processing logic of the storage processor has utilized processor cores within the data storage system to process host I/O requests during the drive rebuild time window without knowing that a drive rebuild is underway, and without knowing which specific processor cores are being used to execute drive rebuild jobs. As a result, host I/O request processing has indiscriminately been performed under all load conditions on the same processor cores that are executing the drive rebuild jobs. The resulting mixing of I/O request processing and drive rebuild jobs on individual processor cores would at times significantly decrease host I/O request processing performance (e.g. by increasing I/O request processing latency) during the drive rebuild time window, especially when the rate of host I/O requests being processed was low.

To address the above described and other shortcomings of previous technologies, new technology is disclosed herein that operates by, in response to detecting failure of a data storage drive, rebuilding data previously stored on the failed data storage drive on a replacement data storage drive by executing multiple drive rebuild jobs on a first set of processor cores in the storage processor. While rebuilding the data previously stored on the failed data storage drive on the replacement data storage drive, the disclosed technology uses a second set of processor cores in the storage processor to process host I/O (Input/Output) requests.

In some embodiments, the host I/O requests processed by the second set of processor cores while the data previously stored on the failed storage drive is being rebuilt may consist of a first set of host I/O requests, and the disclosed technology may further operate, while rebuilding the data previously stored on the failed data storage drive on the replacement data storage drive, to i) calculate a current total number of outstanding host I/O requests, ii) determine whether the current total number of outstanding host I/O requests exceeds a threshold maximum number of outstanding host I/O requests, and iii) in response to a determination that the current total number of outstanding host I/O requests exceeds a threshold maximum number of outstanding host I/O requests, use at least one processor core in the first set of processor cores to process a second set of one or more host I/O requests.

In some embodiments, the disclosed technology uses the at least one processor core in the first set of processor cores to process the second set of host I/O requests by using the at least one processor core in the first set of processor cores to process the second set of host I/O requests while the at least one processor core in the first set of processor cores additionally also executes at least one of the drive rebuild jobs.

In some embodiments, the disclosed technology uses the at least one processor core in the first set of processor cores to process the second set of host I/O requests by using the at least one processor core in the first set of processor cores to process the second set of host I/O requests while at least one processor core in the second set of processor cores simultaneously processes at least one host I/O request in the first set of host I/O requests in parallel.

In some embodiments, the processor cores in the first set of processor cores are processor cores that are connected to a first physical socket of the data storage system, and the processor cores in the second set of processor cores are processor cores that are connected to a second physical socket of the data storage system.

In some embodiments, the disclosed technology calculates the current total number of outstanding host I/O requests by maintaining a count of host I/O requests for which processing has previously been started on one of the processor cores, and for which processing has not yet completed.

In some embodiments, the disclosed technology may divide the current total number of outstanding host I/O requests by a total number of processor cores in both the first set of processor cores and the second set of processor cores before determining whether the current total number of outstanding host I/O requests exceeds the threshold maximum number of outstanding host I/O requests.

In some embodiments, the threshold maximum number of outstanding host I/O requests may be a value that limits an average host I/O request processing latency obtained while rebuilding the data previously stored on the failed data storage drive on the replacement data storage drive to less than a specific latency value.

Embodiments of the disclosed technology may provide significant advantages over previous technical solutions. For example, the disclosed technology advantageously utilizes processor cores within the data storage system to process host I/O requests during the drive rebuild time window based on which specific processor cores are being used to execute drive rebuild jobs. As a result, under low host I/O request loads, some processor cores may be used exclusively to execute drive rebuild jobs, while other processor cores are used in parallel to exclusively process host I/O requests. Processor cores used to execute drive rebuild jobs are only shared with the processing of host I/O requests when the total number of outstanding host I/O requests exceeds the threshold maximum number of outstanding host I/O requests. For example, during the drive rebuild time window, when the host I/O request load is low, host I/O requests may be completely processed using processor cores in the second set of processor cores, which are not used to execute any drive rebuild jobs. Under such circumstances, host I/O request processing latency is not negatively impacted by the rebuilding of the data previously stored on the failed data storage drive. As host I/O request levels increase, the number of outstanding host I/O requests may increase above the maximum threshold. In such a case, one or more of the processor cores in the first set of processor cores may be used both to execute a drive rebuild job and also process one or more host I/O requests, thus increasing the level of processor core parallelism for processing host I/O request and reducing the increase in latency experienced by host I/O requests during the drive rebuild time window even for relatively higher levels of host I/O requests. In addition, drive rebuild performance is not negatively affected by the processing of host I/O requests for lower host I/O request loads, since all the processor cores in the first set of processor cores can be exclusively used to execute drive rebuild jobs. Under higher host I/O request loads, the specific number of processor cores in the first set of processor cores that are shared with host I/O request processing is dynamically adaptive to the current total number of outstanding host I/O requests, thus avoiding unnecessary over-sharing of processor cores in the first set of processor cores, and unneeded increases in the duration of the drive rebuild time window, during which the data storage system may be subject to an increased risk of data loss.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
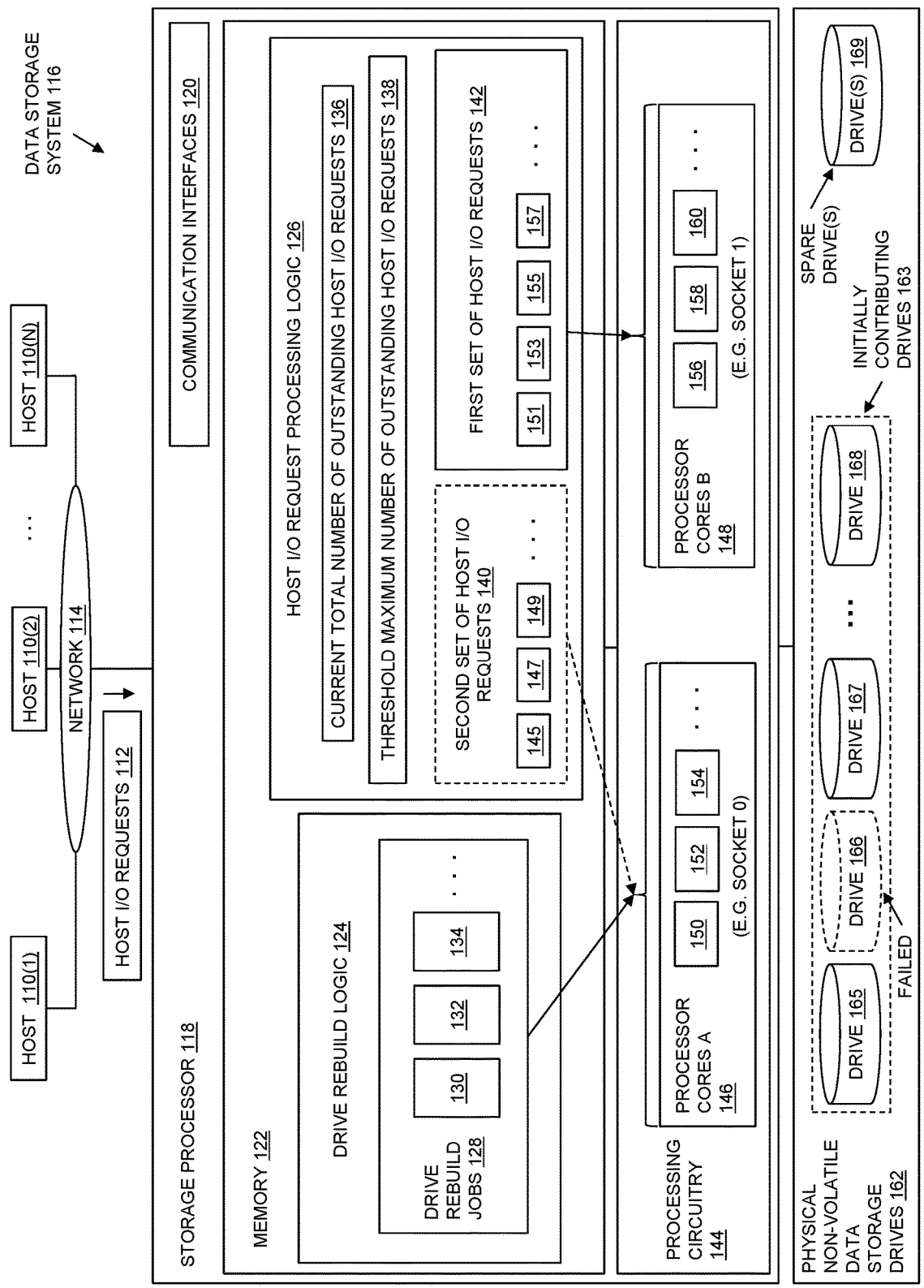
FIG. 1 is a block diagram showing an example of a data storage system in which an example of the disclosed technology is embodied.

Embodiments of the invention will now be described with reference to the figures. The embodiments described herein are provided only as examples, in order to illustrate various features of some embodiments of the disclosed technology, and the invention is broader than the specific embodiments described herein.

Embodiments of the technology disclosed herein may provide improvements over previous technologies by utilizing processor cores within the data storage system to process host I/O requests during a drive rebuild time window based on which specific processor cores are being used to execute drive rebuild jobs and the current host I/O request load. Drive rebuild jobs are executed on a first set of processor cores. When the host I/O request load is low, host I/O requests may be completely processed using processor cores in a second set of processor cores, which are not used to execute any of the drive rebuild jobs, so that host I/O request processing latency is not negatively impacted by the rebuilding of the data previously stored on the failed data storage drive. When the host I/O request level increases sufficiently, the number of outstanding host I/O requests increases above a maximum threshold, causing one or more of the processor cores in the first set of processor cores to be used both to process host I/O requests and also execute a drive rebuild job. In this way, the level of processor cores used for processing host I/O requests may be dynamically increased if needed, in order to reduce or eliminate the additional latency that would otherwise be experienced by host I/O requests during the drive rebuild time window during periods of relatively higher levels of host I/O requests.

During operation of embodiments of the technology disclosed herein, in response to detecting the failure of a data storage drive, data previously stored on the failed data storage drive is rebuilt on a replacement data storage drive by drive rebuild jobs executing exclusively on a first set of processor cores. While rebuilding the data previously stored on the failed data storage drive on the replacement data storage drive, the disclosed technology advantageously uses a second set of processor cores to process host I/O (Input/

Output) requests. The host I/O requests processed by the second set of processor cores while rebuilding the data previously stored on the failed storage drive may consist of or include a first set of host I/O requests processed during the drive rebuild time window, and the disclosed technology may further operate while rebuilding the data previously stored on the failed data storage drive on the replacement data storage drive to i) calculate a current total number of outstanding host I/O requests, ii) determine whether the current total number of outstanding host I/O requests exceeds a threshold maximum number of outstanding host I/O requests. In response to a determination that the current total number of outstanding host I/O requests exceeds a threshold maximum number of outstanding host I/O requests, the disclosed technology uses at least one processor core in the first set of processor cores to additionally process a second set of host I/O requests during the drive rebuild time window.

FIG. 1 is a block diagram showing an operational environment for the disclosed technology, including an example of a storage processor in a data storage system in which the disclosed technology is embodied. FIG. 1 shows a number of physical and/or virtual Host Computing Devices 110, referred to as "hosts" and shown for purposes of illustration by Hosts 110(1) through 110(N). The hosts and/or applications executing thereon may access non-volatile data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110(1) and/or applications accessing non-volatile data storage provided by Data Storage System 116 may execute within Data Storage System 116.

Data Storage System 116 includes at least one Storage Processor 118 that is communicably coupled to Network 114 and Physical Non-Volatile Data Storage Drives 162, e.g. though one or more Communication Interfaces 120. No particular hardware configuration is required, and Storage Processor 118 may be embodied as any specific type of device that is capable of processing host input/output (I/O) requests received from Hosts 110 (e.g. I/O read and I/O write requests, etc.), and of persistently storing and retrieving host data indicated by such requests. In some embodiments, Storage Processor 118 is one of two storage processors in Data Storage System 116, and is connected to the other storage processor by way of an interconnection communication channel within the Data Storage System 116. In such embodiments, the two storage processors may be configured to provide data storage services to the Hosts 110 in an active/active mode, such that both storage processors operate to service the Host I/O Requests 112.

The Physical Non-Volatile Data Storage Drives 162 may include physical data storage drives such as solid state drives, magnetic disk drives, hybrid drives, optical drives, and/or other specific types of drives. Physical Non-Volatile Data Storage Drives 162 may be directly physically connected to and/or contained within Storage Processor 118, and/or may be indirectly connected to Storage Processor 118, e.g. by way of one or more networks.

A Memory 122 in Storage Processor 118 stores program code that is executable on Processing Circuitry 144, as well as data generated and/or processed by such program code. Memory 122 may include volatile memory (e.g. RAM), and/or other types of memory. The Processing Circuitry 144 may, for example, include or consist of one or more microprocessors, e.g. central processing units (CPUs), multi-core processors, chips, and/or assemblies, and associated circuitry. As shown in FIG. 1, Processing Circuitry 144 includes multiple processor cores, each one of which is independently capable of reading and executing program code instructions that may be organized as jobs, tasks, processes, threads, etc. In the example of FIG. 1, Processing Circuitry 144 includes a first set of processor cores (e.g. Processor Cores A 146, made up of some number of processor cores shown by processor cores 150, 152, 154, etc.) that are all physically connected to the Storage Processor 118 exclusively through a first socket (e.g. through a physical "socket 0" of Storage Processor 118), and a second set of processor cores (e.g. Processor Cores B 148, made up of some number of processor cores shown by processor cores 156, 158, 160, etc.) that are all physically connected to the Storage Processor 118 exclusively through a second socket (e.g. through a physical "socket 1" of Storage Processor 118).

Processing Circuitry 144 and Memory 122 together form control circuitry, which is configured and arranged to carry out various methods and functions as described herein. The Memory 122 stores a variety of software components that may be provided in the form of executable program code. For example, Memory 122 may include software components such as Drive Rebuild Logic 124 and Host I/O Request Processing Logic 126. When program code in Memory 122 is executed by Processing Circuitry 144, Processing Circuitry 144 is caused to carry out the operations of the software components. Although certain software components are shown in the Figures and described herein for purposes of illustration and explanation, those skilled in the art will recognize that Memory 122 may include various other software components, such as operating system components, applications, hosts, other specific processes, etc.

During operation of the embodiment shown in FIG. 1, host data indicated by I/O write requests in Host I/O Requests 112 is protected by Host I/O Request Processing Logic 126 using RAID (Redundant Array of Independent Disks) data protection. For example, host data indicated by host I/O write requests processed prior to the failure of Drive 166 may be striped across the set of Initially Contributing Drives 163, together with corresponding per-stripe parity information generated by Host I/O Request Processing Logic 126.

The Initially Contributing Drives 163 includes a number of data storage drives that is at least large enough to support the stripe width of the specific RAID level used to protect the host data. For purposes of illustration, Initially Contributing Drives 163 includes Drive 165, Drive 166, Drive 167, and so on through drive 168.

In response to detecting that Drive 166 has failed, Drive Rebuild Logic 124 executes multiple drive rebuild jobs on Processor Cores A 146 to rebuild the data that was previously stored on Drive 166 on one or more spare data storage drives, e.g. on one or more functional spare data storage drives such as Drive(s) 169. For example, Drive Rebuild Logic 124 executes Drive Rebuild Jobs 128, shown for purposes of illustration including drive rebuild jobs 130, 132, 134, and so on, on the Processor Cores A 146. Each one of the drive rebuild jobs in Drive Rebuild Jobs 128 is executed on a single one of the processor cores in Processor Cores A 146. None of the drive rebuild jobs in Drive Rebuild Jobs 128 are executed on the processor cores in Processor Cores B 148. The Drive Rebuild Jobs 128 each use the host data and parity information previously stored by Host I/O Request Processing Logic 126 on the surviving data storage drives within Initially Contributing Drives 163 to rebuild the host data that was previously stored on the failed Drive 166 onto at least one replacement data storage drive, e.g. onto one or more drives in the Drive(s) 169, according to the specific RAID level used to protect the host data.

In some embodiments, mapped RAID technology may be used, in which each data storage drive in Initially Contributing Drives 163 is divided by Host I/O Request Processing Logic 126 into multiple contiguous regions of physical non-volatile data storage referred to as "drive extents". Individual sets of drive extents, in which each drive extent is located on a different data storage drive in Initially Contributing Drives 163, are then used to store RAID stripes containing blocks of data and parity information in the manner that data and parity information are striped across disks in groups of disks in traditional RAID systems. Each set of drive extents is mapped to a corresponding range of logical block addresses, referred to herein for purposes of explanation as a RAID extent, and then data written to a given RAID extent is striped by Host I/O Request Processing Logic 126 across the drive extents contained in the corresponding set of drive extents. In such mapped RAID embodiments, each drive rebuild job in Drive Rebuild Jobs 128 may operate to rebuild host data previously stored to a single one of the drive extents located on Drive 166 to a spare drive extent located in Drive(s) 169, using the host data and parity information stored in drive extents that are i) located on the surviving drives in the Initially Contributing Drives 163, and that are ii) contained in the same set of drive extents as that single one of the drive extents located in Drive 166.

While the data previously stored on Drive 166 is being rebuilt on Drive 169 (i.e. during the drive rebuild time window), Host I/O Request Processing Logic 126 uses Processor Cores B 148 to process host I/O (Input/Output) requests. Each host I/O request processed by Host I/O Request Processing Logic 126 is completely processed using a single processor core.

For example, while the data previously stored on Drive 166 is being rebuilt on Drive 169 (i.e. during the drive rebuild time window), Host I/O Request Processing Logic 126 may utilize the Processor Cores B 148 to process First Set of Host I/O Requests 142. Host I/O Request Processing Logic 126 may further operate while the data previously stored on Drive 166 is being rebuilt on Drive 169 (i.e. during the drive rebuild time window) to calculate a current total number of outstanding host I/O requests, shown in FIG. 1 by Current Total Number of Outstanding Host I/O Requests 136. For example, Host I/O Request Processing Logic 126 may continuously calculate Current Total Number of Outstanding Host I/O Requests 136 by incrementing Current Total Number of Outstanding Host I/O Requests 136 each time processing of a host I/O request is started on a processor core, and by decrementing Current Total Number of Outstanding Host I/O Requests 136 each time processing of a host I/O request previously started on a processor core is completed. In this way, some embodiments of the disclosed technology may calculate the Current Total Number of Outstanding Host I/O Requests 136 by maintaining a count of host I/O requests for which processing has previously been started on one of the processor cores in either Processor Cores A 146 or Processor Cores B 148, and for which processing has not yet been completed.

Further while the data previously stored on Drive 166 is being rebuilt on Drive 169 (i.e. during the drive rebuild time window), Host I/O Request Processing Logic 126 may also determine whether Current Total Number of Outstanding Host I/O Requests 136 exceeds a threshold maximum number of outstanding host I/O requests, shown by Threshold Maximum Number of Outstanding Host I/O Requests 138. In some embodiments, Threshold Maximum Number of Outstanding Host I/O Requests 138 may be set at system initialization or design time to a value that results in the disclosed technology limiting the average host I/O request processing latency obtained while rebuilding the data previously stored on Drive 166 on Drive(s) 169 to less than a specific latency value, e.g. 2 milliseconds.

In some embodiments, Host I/O Request Processing Logic 126 may divide Current Total Number of Outstanding Host I/O Requests 136 current total number of outstanding host I/O requests by a total number of processor cores in both Processor Cores A 146 and Processor Cores B 148 before comparing the result of the division to Threshold Maximum Number of Outstanding Host I/O Requests 138. In such embodiments, if the result of the division is greater than Threshold Maximum Number of Outstanding Host I/O Requests 138, then Host I/O Request Processing Logic 126 may determine that Current Total Number of Outstanding Host I/O Requests 136 exceeds Threshold Maximum Number of Outstanding Host I/O Requests 138. In such embodiments, the Threshold Maximum Number of Outstanding Host I/O Requests 138 is set to a maximum average number of outstanding host I/O requests across all the processor cores of the storage processor that is necessary to provide the desired limit on average host I/O request processing latency during the drive rebuild time window.

Further while the data previously stored on Drive 166 is being rebuilt on Drive 169 (i.e. during the drive rebuild time window), Host I/O Request Processing Logic 126 may also, in response to a determination that Current Total Number of Outstanding Host I/O Requests 136 exceeds Threshold Maximum Number of Outstanding Host I/O Requests 138, use at least one processor core in Processor Cores A 146 to process a second set of one or more host I/O requests, shown in FIG. 1 by Second Set of Host I/O Requests 140, shown for purposes of illustration including host I/O requests 145, 147, 149, and so on.

For example, in some embodiments, Host I/O Request Processing Logic 126 uses at least one processor core in Processor Cores A 146 to process Second Set of Host I/O Requests 140 at least in part by using at least one processor core in Processor Cores A 146 to process at least one of the host I/O requests in Second Set of Host I/O Requests 140 while that processor core additionally also executes at least one of the drive rebuild jobs in Drive Rebuild Jobs 128.

In another example, in some embodiments, Host I/O Request Processing Logic 126 uses at least one processor core in Processor Cores A 146 to process Second Set of Host I/O Requests 140 at least in part by using at least one processor core in Processor Cores A 146 to process at least one of the host I/O requests in Second Set of Host I/O Requests 140 while at least one processor core in Processor Cores B 148 simultaneously processes at least one host I/O request in First Set of Host I/O Requests 142 in parallel.

In some embodiments, one or more software tools may be used to automatically select a value for Threshold Maximum Number of Outstanding Host I/O Requests 138. The threshold generation tool provided in this regard by the disclosed technology may, for example, be contained in Memory 122, e.g. within Host I/O Request Processing Logic 126 or some other software logic stored in Memory 122, and executed on Processing Circuitry 144, e.g. at system start-up. Alternatively, the tool may be stored in and executed on a computer system other than Data Storage System 116. The automatically selected value for Threshold Maximum Number of Outstanding Host I/O Requests 138 may then be stored in Memory 122 for use during subsequent drive rebuild time windows. In the case where it is desired to refresh the value of Threshold Maximum Number of Outstanding Host I/O Requests 138, the tool may be manually triggered to run again, e.g. by a system administrator or other user.

The tool operates to select a value for Threshold Maximum Number of Outstanding Host I/O Requests 138 such that within periods of time during the drive rebuild time window when the level of host I/O requests is relatively low, TOPS (host I/O request Operations Per Second) and latency are not adversely impacted by the rebuilding of the data previously stored on the failed data storage drive, because no I/O request processing is performed on Processor Cores A 146. The tool also operates to select the value for Threshold Maximum Number of Outstanding Host I/O Requests 138 such that within periods of time during the drive rebuild time window when the level of host I/O requests is relatively high, in order to provide higher levels of IOPS, some host I/O request processing (e.g. Second Set of Host I/O Requests 14) is performed on Processor Cores A 146, with the assumption that the rebuild jobs do not consume all the CPU (Central Processing Unit) time of the respective processor cores on which they execute. Accordingly, the tool may generate a value for Threshold Maximum Number of Outstanding Host I/O Requests 138 that provides the best possible TOPS while limiting the performance impact on host I/O request processing and rebuilding of the data previously stored on the failed data storage drive.

For example, the tool may operate by executing I/O generator threads that generate host I/O requests that are passed to Host I/O Request Processing Logic 126. As the tool increases the number of I/O generator threads being executed, the host I/O request workload also increases. The tool automatically selects for Threshold Maximum Number of Outstanding Host I/O Requests 138 a value for which a maximum TOPS ("MAX IOPS") is obtained under the condition that the average host I/O request average latency is less than a specific latency value, such as 2 milliseconds. For example, the tool may operate to select for the threshold the best value X from the set of candidate values {1, 2, . . . M} by increasing the host I/O request workload by increasing the total number of I/O generator threads ("io_load_thread_num") that are executed through the values 1, 2, . . . N, while seeking the value for X that enables the technology to obtain the highest TOPS that can be obtained during the drive rebuild time window while also maintaining a host I/O request latency of less than 2 milliseconds, as in the following pseudo-code:

```
// Initialize the variables
threshold = 0
MAX_IOPS = 0
for X in {1, 2, . . . , M}:
    IOPS[X] = 0
// Determine the MAX IOPS for the candidate thresholds =
{1, 2, . . . , M} and for io_load_thread_num in the range
{1, 2, . . . N}with the condition that latency < 2 ms
    for X in {1, 2, . . . M}:
        for io_load_thread_num in {1, 2, . . . N}:
            latency = average_latency
            IOPS = average_IOPS
            If latency < 2 ms and IOPS[X] < IOPS:
                IOPS[X] = IOPS
            if MAX_IOPS < IOPS[X]:
                threshold = X
                MAX_IOPS = IOPS[X]
```

In this way, the threshold generation tool may operate to obtain the best value for Threshold Maximum Number of Outstanding Host I/O Requests 138, i.e. a threshold value that can obtain the best TOPS during the drive rebuild time window while maintaining a host I/O request processing latency of less than two milliseconds.

Figure 2:
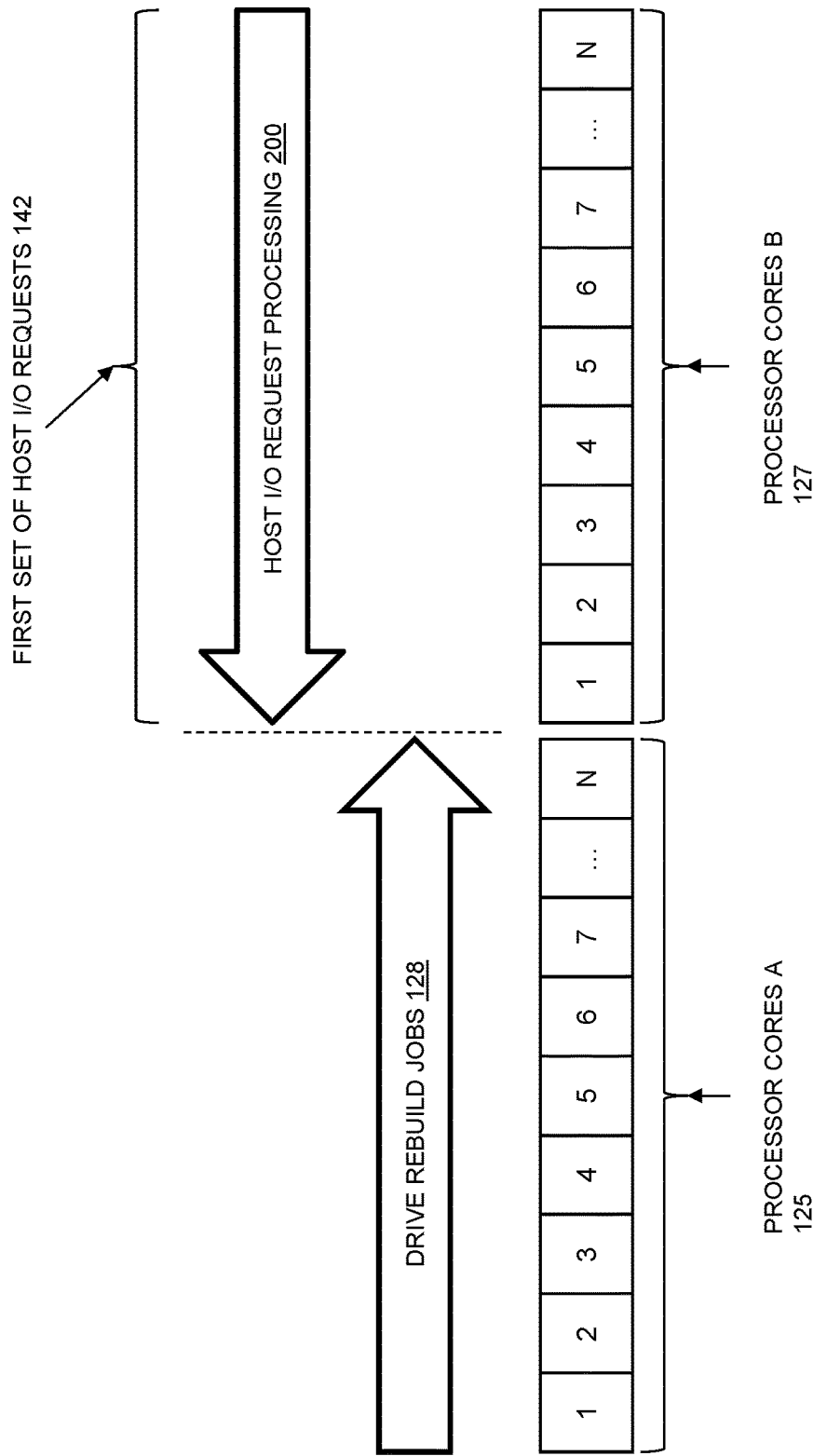
FIG. 2 is a block diagram showing an example of operation while the level of host I/O request processing is low.

FIG. 2 is a block diagram showing an example of operation while the level of host I/O request processing is low. In the example of FIG. 2, Drive Rebuild Jobs 128 are executing on the processor cores in Processor Cores A 125, and the current total number of outstanding host I/O requests does not exceed the threshold maximum number of outstanding host I/O requests. Accordingly, during time periods within the drive rebuild time window during which such relatively lower levels of host I/O request load occur, the processing of host I/O requests (e.g. Host I/O Request Processing 200) may extend across some or all of the processor cores in Processor Cores B 127, and accordingly the processing of host I/O requests during such time periods consists of the processing of First Set of Host I/O Requests 142 on Processor Cores B 127.

Figure 3:
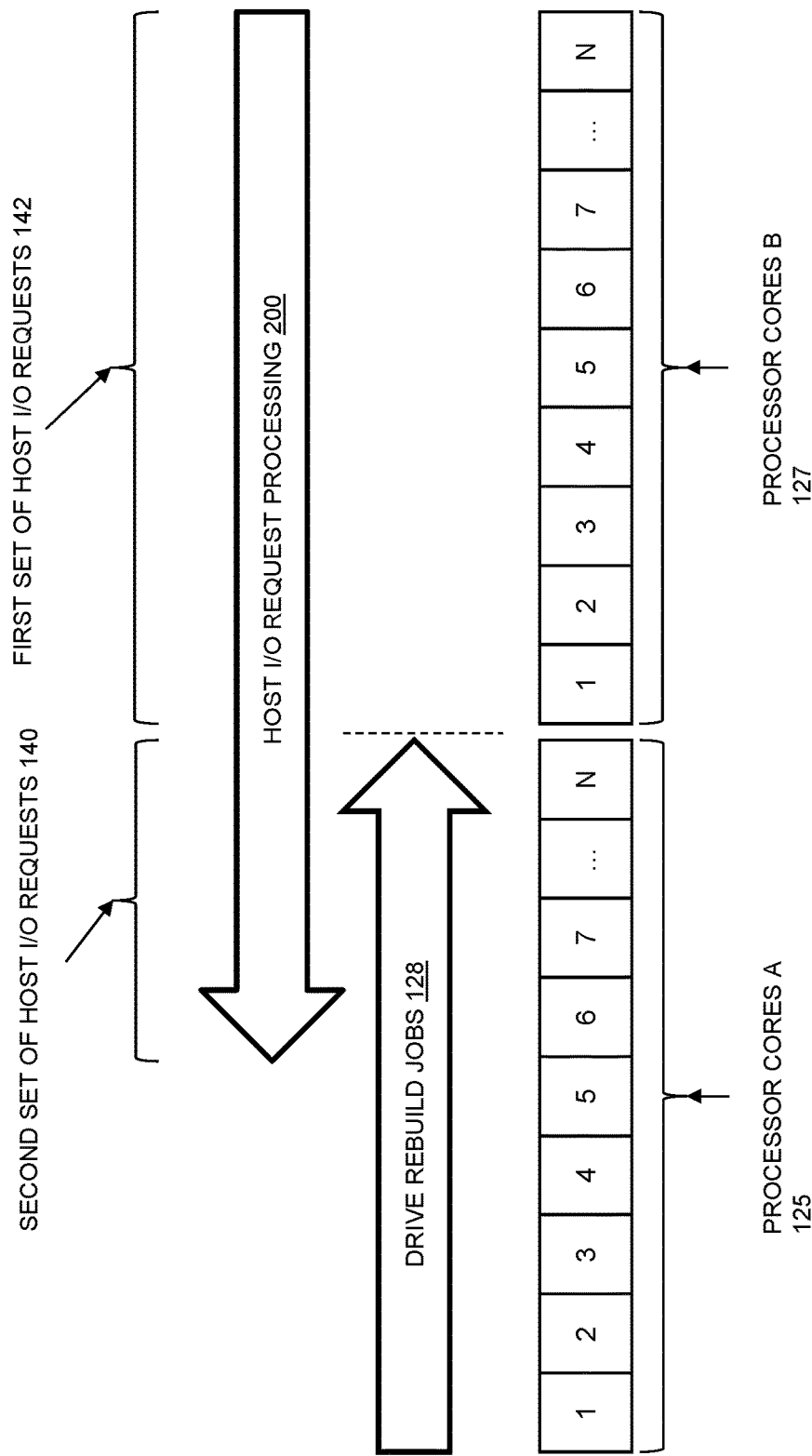
FIG. 3 is a block diagram showing an example of operation after the level of host I/O request processing has increased to a higher level.

FIG. 3 is a block diagram showing an example of operation after the level of host I/O request processing has increased to a higher level. In the example of FIG. 3, Drive Rebuild Jobs 128 are executing on the processor cores in Processor Cores A 125, and the current total number of outstanding host I/O requests exceeds the threshold maximum number of outstanding host I/O requests. Accordingly, during time periods within the drive rebuild time window during which such relatively higher levels of host I/O request load occur, the processing of host I/O requests (e.g. Host I/O Request Processing 200) may extend across some or all of the processor cores in Processor Cores B 127, and also across some or all of the processor cores in Processor Cores A 125. Accordingly, the processing of host I/O requests during such time periods consists of the processing of First Set of Host I/O Requests 142 on Processor Cores B 127, and the processing of Second Set of Host I/O Requests 140 on Processor Cores A 125.

Figure 4:
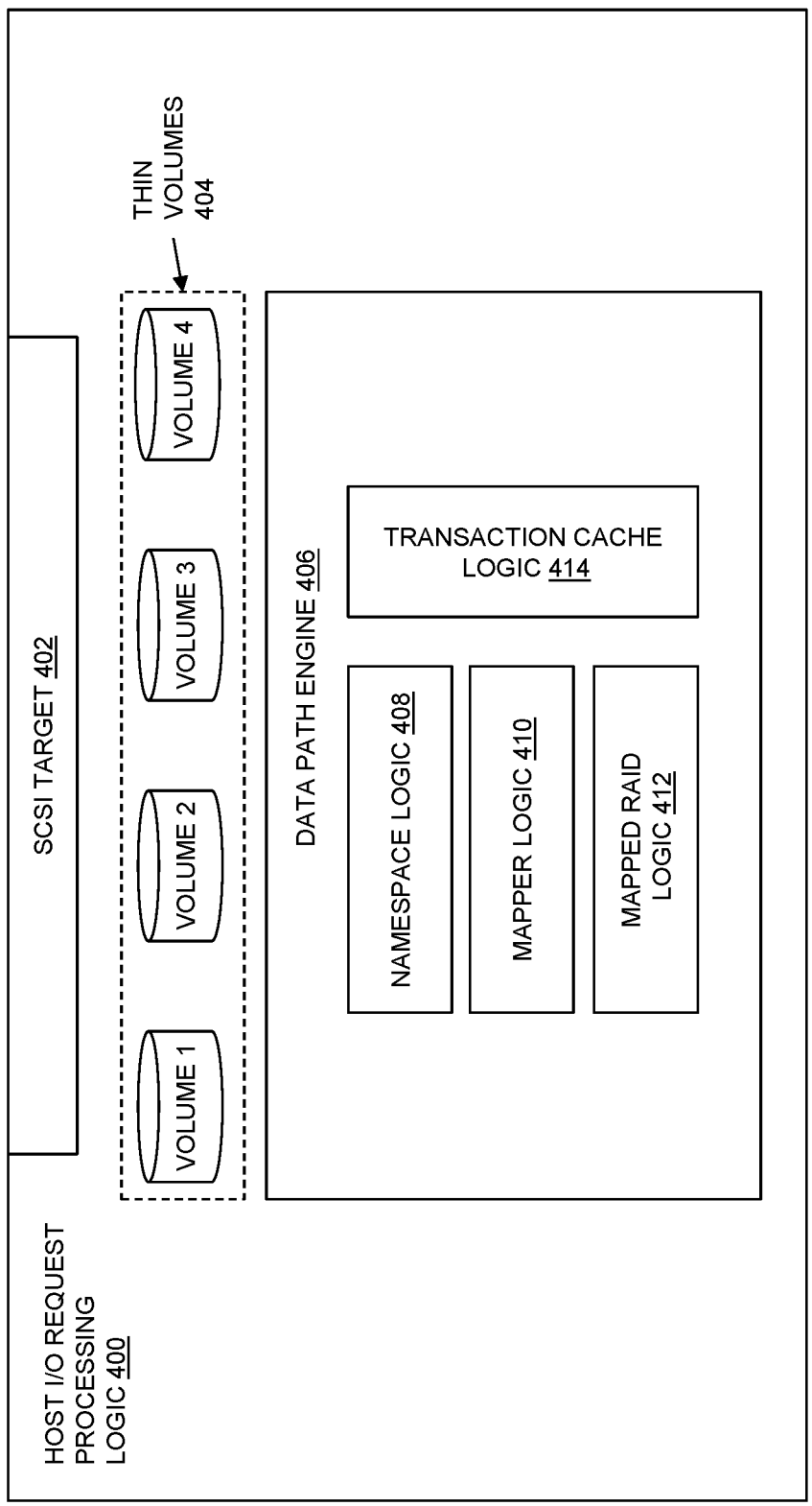
FIG. 4 is a block diagram showing an example of some components in the host I/O request processing logic in some embodiments.

FIG. 4 is a block diagram showing an example of some components in the disclosed host I/O request processing logic in some embodiments. As shown in FIG. 4, the Host I/O Request Processing Logic 400 includes a SCSI (Small Computer System Interface) Target 402 that operates as a front end and receives host I/O requests consisting of SCSI commands from a Fibre Channel HBA (Host Bus Adapter) or an ISCI (Internet Small Computer Systems Interface). The SCSI Target 402 then passes the SCSI commands to the Data Path Engine 406 for processing. The SCSI Target 402 assigns the processing of each received host I/O request, performed by the Data Path Engine 406, to a single processor core. Accordingly, Data Path Engine 406 completely processes each one of the host I/O requests that it receives on a single one of the processor cores of the data storage system. An application programming interface in Drive Rebuild Logic 124 may be provided to enable SCSI Target 402 to determine whether a data storage drive rebuild is currently in progress.

The modules within Data Path Engine 406 that perform the processing of each individual host I/O request may include Namespace Logic 408, Mapper Logic 410, Mapped RAID Logic 412, and/or Transaction Cache Logic 414. Namespace Logic 408 provides file system functionality, e.g. maintaining a directory and inode (index node) mapped to Thin Volumes 404. Mapper Logic 410 maps a logical address space of non-volatile data storage to the thin volumes. In addition, while processing each of the individual host I/O requests received from SCSI Target 402, Mapper Logic 410 may further perform various in-line data storage services on the host data indicated by the individual host I/O requests that are processed, e.g. prior to the host data indicated by the host I/O requests being flushed from a cache to the physical non-volatile data storage drives of the data storage system. Such in-line data storage services performed on the host data while the host I/O requests are processed may, for example, include lossless data compression, data deduplication, and/or other services.

Transaction Cache Logic 414 may provide a transactional cache and locking mechanism.

Mapped RAID Logic 414 may divide the data storage drives into contiguous regions of physical non-volatile data storage referred to herein as "drive extents", and then use individual sets of drive extents to store RAID stripes containing blocks of data and parity information according to RAID levels that are used to protect the host data such as, for example, 4D+1P ("four data plus one parity") RAID-5, for one or more RAID extents. In 4D+1P RAID-5, each stripe consists of 4 data blocks and a block of parity information. When 4D+1P RAID-5 is used for a RAID extent, at least five drive extents must be contained in the drive extent set assigned and mapped to the corresponding RAID extent of logical address space, so that each one of the four data blocks and the parity information for each stripe can be stored on a different drive extent, and therefore be stored on a different data storage drive. In the event that a data storage drives fails containing one of the drive extents in a drive extent set assigned and mapped to a RAID extent (e.g. Drive 166), the data stored in the physical blocks contained in that RAID extent is rebuilt (e.g. by one of the Drive Rebuild Jobs 128) on a drive extent located on a functioning data storage drive (e.g. on Drive(s) 169) by performing XOR operations on the data and parity stored on the remaining drive extents in the drive extent set on a per-stripe basis. Mapped RAID Logic 414 may provide various other RAID levels to one or more RAID extents, in order to provide a higher level of data protection, e.g. data protection even in the event that multiple disks fail concurrently. For example, Mapped RAID Logic 414 may use 4D+2P RAID-6 to provide striping of the host data with double distributed parity information that is provided on a per-stripe basis.

Figure 5:
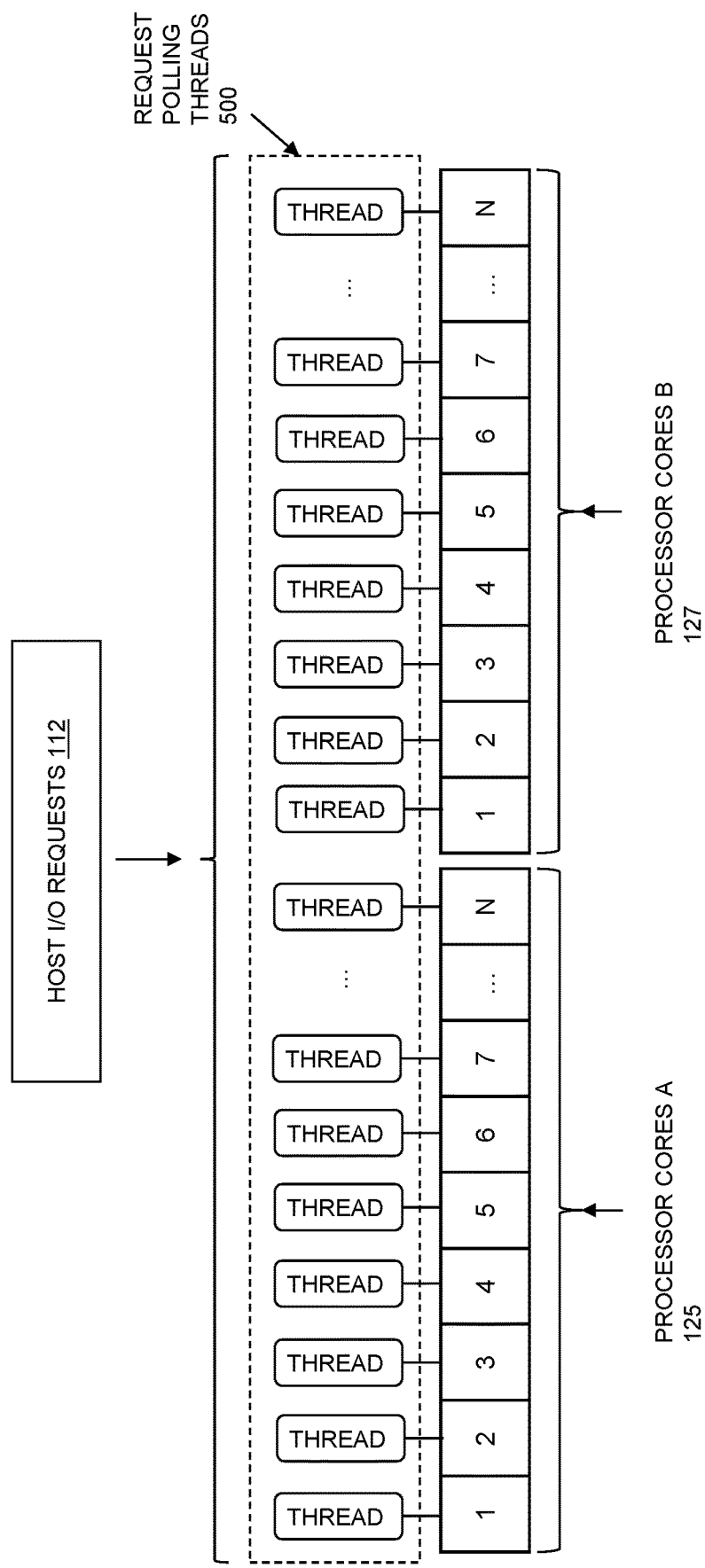
FIG. 5 is a block diagram showing an example of execution threads that run on each of the processor cores in the data storage system and are used to poll host I/O requests in some embodiments.

FIG. 5 is a block diagram showing an example of Request Polling Threads 500 that are execution threads that may be run by Host I/O Request Processing Logic 126 (e.g. by SCSI Target 402) on each of the processor cores Processing Circuitry 144 (e.g. on each of the processor cores in Processor Cores A 125 and each of the processor cores in Processor Cores B 127). Each request polling thread runs on a single processor core, and processes host I/O requests in Host I/O Requests 112 that have been received by SCSI Target 402 and are ready for processing by Data Path Engine 406. When one of the request polling threads in Request Polling Threads 500 is notified of a host I/O request in Host I/O Requests 112 that has been received by SCSI Target 402 and is ready for processing by Data Path Engine 406, it performs the steps shown in FIG. 6 to determine whether that host I/O request is processed on the processor core that runs that request polling thread. In this way, each request polling thread controls which host I/O requests are processed on the processor core that it executes on. The request polling threads in Request Polling Threads 500 are invoked in a round robin manner by SCSI Target 402 to process received host I/O requests.

Figure 6:
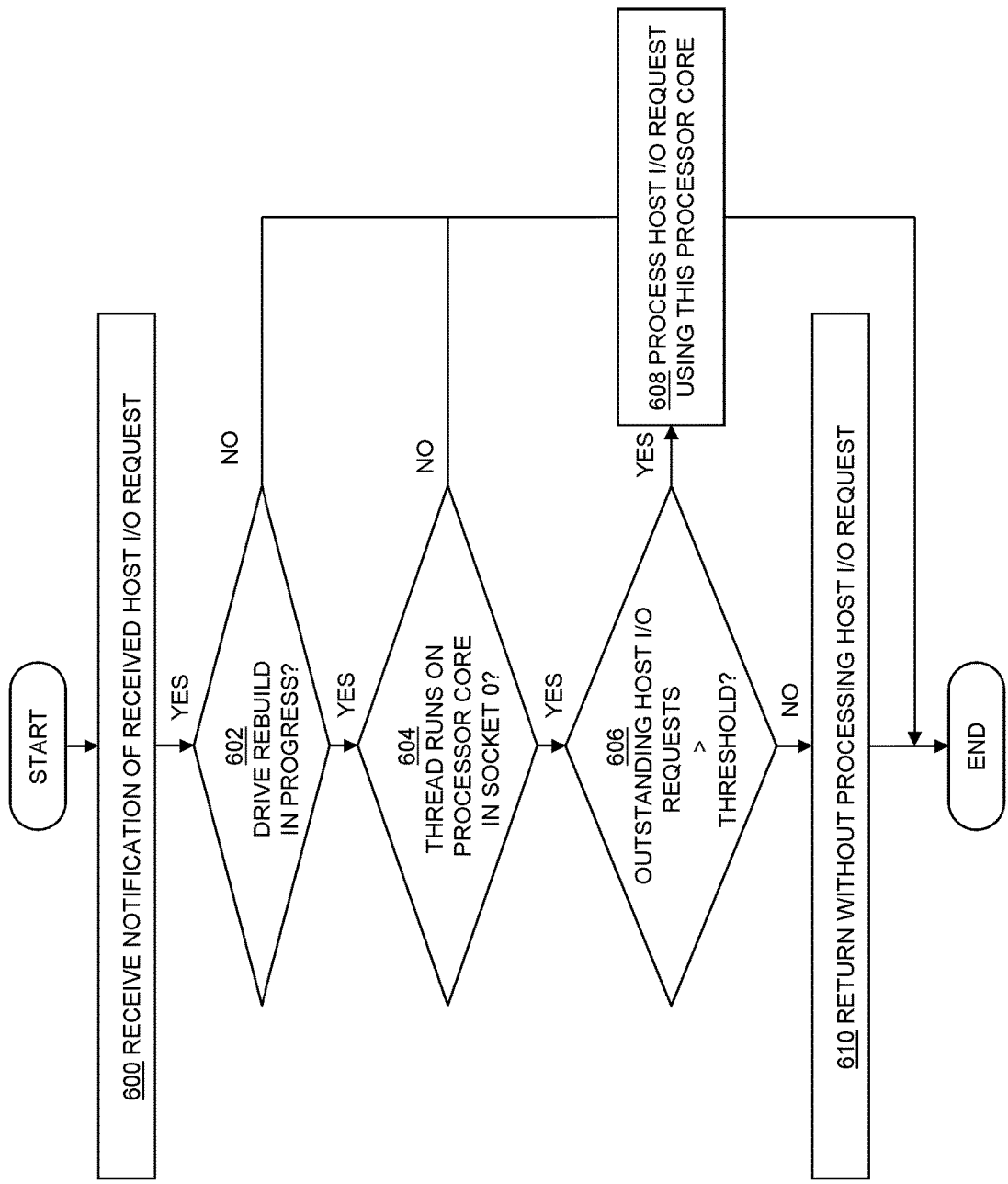
FIG. 6 is a flow chart illustrating the operation of the execution threads shown in FIG. 5 in some embodiments.

FIG. 6 is a flow chart illustrating the operation of the Request Polling Threads 500 shown in FIG. 5. The steps shown in FIG. 6 are used by each one of the request polling threads to determine whether a host I/O request passed to that individual request polling thread is to be processed on the same processor core on which that request polling thread executes.

At step 600, the request polling thread receives a notification of a received host I/O request that is ready to be processed by the host I/O request processing logic, e.g. a host I/O request that is ready to be processed by the Data Path Engine 406.

At step 602, the request polling thread determines whether data previously stored on a failed data storage drive is currently being rebuilt on a replacement data storage drive. For example, the request polling thread may determine whether a drive rebuild is in progress through an application programming interface to Drive Rebuild Logic 124 or the like.

If the request polling thread determines that data previously stored on a failed data storage drive is currently being rebuilt on a replacement data storage drive, then step 602 is followed by step 604. Otherwise, step 602 is followed by step 608.

At step 604, the request polling thread determines whether the processor core on which the request polling thread executes is within Processor Cores A 146. For example, at step 604 the request polling thread may branch depending on whether the request polling thread executes on a processor core connected to the storage processor through a first socket, e.g. socket 0.

If the request polling thread executes on a processor core connected to the storage processor through socket 0 (i.e. is within Processor Cores A 146), then step 604 is followed by step 606. Otherwise, step 604 is followed by step 608.

At step 606, the request polling thread determines whether the Current Total Number of Outstanding Host I/O Requests 136 exceeds the Threshold Maximum Number of Outstanding Host I/O Requests 138. If the request polling thread determines that the Current Total Number of Outstanding Host I/O Requests 136 exceeds the Threshold Maximum Number of Outstanding I/O Requests 138, then step 606 is followed by step 608. Otherwise, step 606 is followed by step 610.

At step 608, the request polling thread processes the host I/O request on the processor core that is executing the request polling thread, e.g. by executing Host I/O Request Processing Logic 126 (e.g. some or all of Data Path Engine 406) on that processor core to process the host I/O request.

At step 610, the request polling thread returns without processing the host I/O request. As part of the round-robin invocation of the individual request polling threads within Request Polling Threads 600, an indication of the host I/O request will subsequently be passed to a request polling thread executing on one of the processor cores in Processor Cores B 148 (e.g. a processor core connected to the storage processor through socket 1), and that request polling thread will cause the host I/O request to be processed on the processor core that executes that request polling thread, e.g. by executing Host I/O Request Processing Logic 126 (e.g. some or all of Data Path Engine 406) on that processor core.

Figure 7:
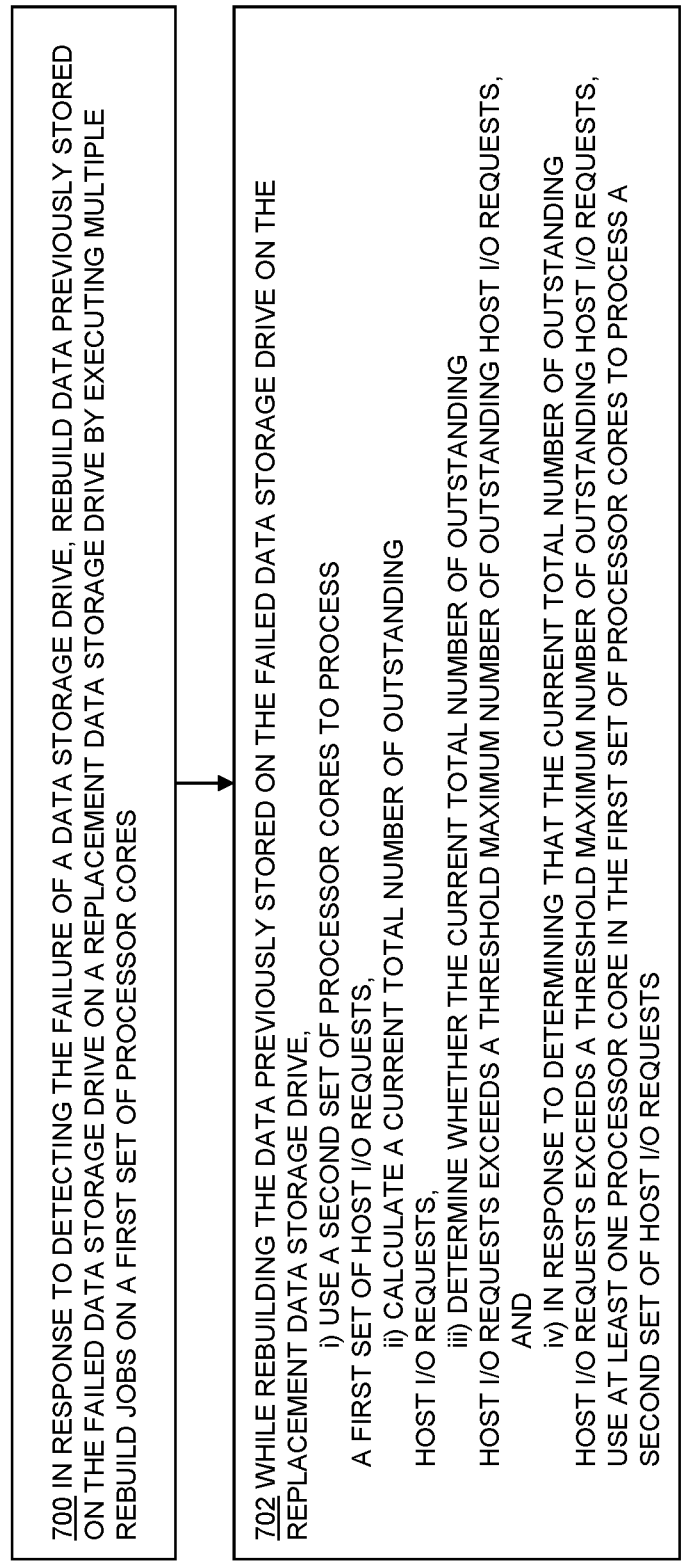
FIG. 7 is a flow chart illustrating steps performed during operation of some embodiments.

FIG. 7 is a flow chart illustrating steps performed during operation of some embodiments.

At step 700, in response to detecting the failure of a data storage drive, data previously stored on the failed data storage drive is rebuilt on a replacement data storage drive by executing multiple rebuild jobs on a first set of processor cores.

At step 702, while rebuilding the data previously stored on the failed data storage drive is being rebuilt on the replacement data storage drive by executing the multiple rebuild jobs on the first set of processor cores, the disclosed technology i) uses a second set of processor cores to process a first set of host I/O requests, ii) calculates a current total number of outstanding host I/O requests, iii) determines whether the current total number of outstanding host I/O requests exceeds a threshold maximum number of outstanding host I/O requests, and iv) in response to determining that the current total number of outstanding host I/O requests exceeds a threshold maximum number of outstanding host I/O requests, uses at least one processor core in the first set of processor cores to process a second set of host I/O requests.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   in response to detecting failure of a data storage drive, rebuilding data previously stored on the failed data storage drive on a replacement data storage drive by executing a plurality of rebuild jobs on a first set of processor cores;
   while rebuilding the data previously stored on the failed data storage drive on the replacement data storage drive, using a second set of processor cores to process host I/O (Input/Output) requests, wherein the host I/O requests processed by the second set of processor cores while rebuilding the data previously stored on the failed storage drive comprise a first set of host I/O requests; and
   further while rebuilding the data previously stored on the failed data storage drive on the replacement data storage drive:
      calculating a current total number of outstanding host I/O requests,
      determining whether the current total number of outstanding host I/O requests exceeds a threshold maximum number of outstanding host I/O requests, and
      in response to determining that the current total number of outstanding host I/O requests exceeds a threshold maximum number of outstanding host I/O requests, using at least one processor core in the first set of processor cores to process a second set of host I/O requests.

2. The method of claim 1, wherein using the at least one processor core in the first set of processor cores to process the second set of host I/O requests comprises using the at least one processor core in the first set of processor cores to process the second set of host I/O requests while the at least one processor core in the first set of processor cores additionally executes at least one of the plurality of drive rebuild jobs.

3. The method of claim 2, wherein using the at least one processor core in the first set of processor cores to process the second set of host I/O requests comprises using the at least one processor core in the first set of processor cores to process the second set of host I/O requests while at least one processor core in the second set of processor cores processes at least one host I/O request in the first set of host I/O requests in parallel.

4. The method of claim 1, wherein the processor cores in the first set of processor cores comprise processor cores that are connected to a first physical socket; and wherein the processor cores in the second set of processor cores comprise processor cores that are connected to a second physical socket.

5. The method of claim 1, wherein calculating the current total number of outstanding host I/O requests comprises maintaining a count of host I/O requests for which:
    processing has previously been started on one of the processor cores, and
    processing has not yet completed.

6. The method of claim 1, further comprising dividing the current total number of outstanding host I/O requests by a total number of processor cores in the first set of processor cores and the second set of processor cores before determining whether the current total number of outstanding host I/O requests exceeds the threshold maximum number of outstanding host I/O requests.

7. The method of claim 1, wherein the threshold maximum number of outstanding host I/O requests comprises a value that limits an average host I/O request processing latency obtained while rebuilding the data previously stored on the failed data storage drive on the replacement data storage drive to less than a specific latency value.

8. A data storage system comprising:
    at least one storage processor including processing circuitry and a memory;
    a plurality of non-volatile data storage drives communicably coupled to the storage processor; and
    wherein the memory has program code stored thereon, wherein the program code, when executed by the processing circuitry, causes the processing circuitry to:
        in response to detecting failure of a data storage drive, rebuild data previously stored on the failed data storage drive on a replacement data storage drive by executing a plurality of rebuild jobs on a first set of processor cores;
        while rebuilding the data previously stored on the failed data storage drive on the replacement data storage drive, use a second set of processor cores to process host I/O (Input/Output) requests, wherein the host I/O requests processed by the second set of processor cores while rebuilding the data previously stored on the failed storage drive comprise a first set of host I/O requests; and
        further while rebuilding the data previously stored on the failed data storage drive on the replacement data storage drive:
            calculate a current total number of outstanding host I/O requests,
            determine whether the current total number of outstanding host I/O requests exceeds a threshold maximum number of outstanding host I/O requests, and
            in response to a determination that the current total number of outstanding host I/O requests exceeds a threshold maximum number of outstanding host I/O requests, use at least one processor core in the first set of processor cores to process a second set of host I/O requests.

9. The data storage system of claim 8, wherein the program code, when executed by the processing circuitry, uses the at least one processor core in the first set of processor cores to process the second set of host I/O requests at least in part by using the at least one processor core in the first set of processor cores to process the second set of host I/O requests while the at least one processor core in the first set of processor cores additionally executes at least one of the plurality of drive rebuild jobs.

10. The data storage system of claim 9, wherein the program code, when executed by the processing circuitry, uses the at least one processor core in the first set of processor cores to process the second set of host I/O requests at least in part by using the at least one processor core in the first set of processor cores to process the second set of host I/O requests while at least one processor core in the second set of processor cores processes at least one host I/O request in the first set of host I/O requests in parallel.

11. The data storage system of claim 8, wherein the processor cores in the first set of processor cores comprise processor cores that are connected to a first physical socket; and
    wherein the processor cores in the second set of processor cores comprise processor cores that are connected to a second physical socket.

12. The data storage system of claim 8, wherein the program code, when executed by the processing circuitry, calculates the current total number of outstanding host I/O requests at least in part by maintaining a count of host I/O requests for which:
    processing has previously been started on one of the processor cores, and
    processing has not yet completed.

13. The data storage system of claim 8, wherein the program code, when executed by the processing circuitry, further causes the processing circuitry to divide the current total number of outstanding host I/O requests by a total number of processor cores in the first set of processor cores and the second set of processor cores before causing the processing circuitry to determine whether the current total number of outstanding host I/O requests exceeds the threshold maximum number of outstanding host I/O requests.

14. The data storage system of claim 8, wherein the threshold maximum number of outstanding host I/O requests comprises a value that limits an average host I/O request processing latency obtained while rebuilding the data previously stored on the failed data storage drive on the replacement data storage drive to less than a specific latency value.

15. A computer program product including a non-transitory computer readable medium having instructions stored thereon, wherein the instructions, when executed on processing circuitry, cause the processing circuitry to perform steps including:
    in response to detecting failure of a data storage drive, rebuilding data previously stored on the failed data storage drive on a replacement data storage drive by executing a plurality of rebuild jobs on a first set of processor cores;
    while rebuilding the data previously stored on the failed data storage drive on the replacement data storage drive, using a second set of processor cores to process host I/O (Input/Output) requests, wherein the host I/O requests processed by the second set of processor cores while rebuilding the data previously stored on the failed storage drive comprise a first set of host I/O requests; and
    further while rebuilding the data previously stored on the failed data storage drive on the replacement data storage drive:
        calculating a current total number of outstanding host I/O requests,
        determining whether the current total number of outstanding host I/O requests exceeds a threshold maximum number of outstanding host I/O requests, and in response to determining that the current total number of outstanding host I/O requests exceeds a threshold maximum number of outstanding host I/O requests, using at least one processor core in the first set of processor cores to process a second set of host I/O requests.

* * * * *